(12) United States Patent
Suh et al.

(10) Patent No.: US 8,111,486 B2
(45) Date of Patent: Feb. 7, 2012

(54) HEAD GIMBALS ASSEMBLY OF HARD DISK AND METHOD OF ASSEMBLING THEREOF

(75) Inventors: Sung Dong Suh, Seoul (KR); Hyun Jei Kim, Seoul (KR); Hoo San Lee, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 541 days.

(21) Appl. No.: 12/304,627

(22) PCT Filed: Feb. 1, 2007

(86) PCT No.: PCT/KR2007/000539
§ 371 (c)(1), (2), (4) Date: Dec. 12, 2008

(87) PCT Pub. No.: WO2007/145415
PCT Pub. Date: Dec. 21, 2007

(65) Prior Publication Data
US 2009/0323224 A1 Dec. 31, 2009

(30) Foreign Application Priority Data
Jun. 14, 2006 (KR) .................. 10-2006-0053503

(51) Int. Cl.
*G11B 5/55* (2006.01)
(52) U.S. Cl. ...... 360/265.7; 360/59; 360/128; 360/294.2
(58) Field of Classification Search .................. 360/59, 360/128, 194.6, 294.2, 265.7
See application file for complete search history.

(56) References Cited

U.S. PATENT DOCUMENTS 5,199,090 A 3/1993 Bell
6,404,706 B1 6/2002 Stovall et al.
(Continued)

FOREIGN PATENT DOCUMENTS

EP 1 498 878 A2 1/2005
(Continued)

OTHER PUBLICATIONS

Communication from the Japanese Patent Office issued Apr. 26, 2011, in counterpart Japanese Application No. 2009-515292.

(Continued)

*Primary Examiner* — Thong Q Le
(74) *Attorney, Agent, or Firm* — Sughrue Mion, PLLC

(57) ABSTRACT

A head gimbals assembly for a hard disk for use in a thermally assisted magnetic disk recording medium, in which a laser diode is applied so as to record information with high density. The head gimbals assembly for a hard disk having a plurality of suspensions, each of which is provided with a magnetic head positioned adjacent to a corresponding disk surface among the disks so as to record/reproduce information; a head gimbals body having a centrally formed pivot hole which allows the head gimbals body to be fitted in such a manner as to be rotatable in relation to the disks, the suspensions extending from one end of the head gimbals body; a coil rotator provided at the other end of the head gimbals body so as to rotate the head gimbals body about the pivot hole; and a laser assembly having one or more laser diodes and one or more wave guides, the light emitted from any of the laser diodes is guided to a corresponding magnetic head by the wave guides.

7 Claims, 3 Drawing Sheets

U.S. PATENT DOCUMENTS

2004/0120064 A1 6/2004 Dugas et al.
2006/0233062 A1* 10/2006 Bedillion et al. .......... 369/13.32

FOREIGN PATENT DOCUMENTS

| | | |
|---|---|---|
| JP | 5-133757 A | 5/1993 |
| JP | 08-240423 A | 9/1996 |
| JP | 2001-13339 A | 1/2001 |
| JP | 2002-117502 A | 4/2002 |
| JP | 2002-208169 A | 7/2002 |
| JP | 2003-067901 A | 3/2003 |
| JP | 2003-140213 A | 5/2003 |
| JP | 2006-78570 A | 3/2006 |

OTHER PUBLICATIONS

Japanese Office Action issued on Oct. 4, 2011 in the counterpart Japanese Patent Application No. 2009-515292.

* cited by examiner

[Fig. 1]
PRIOR ART
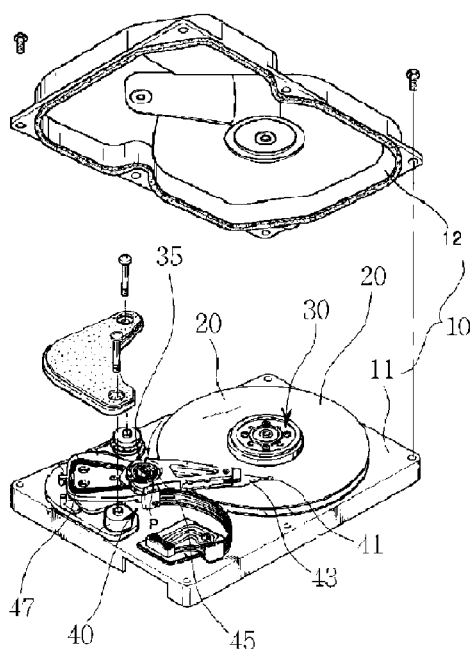
[Fig. 2]
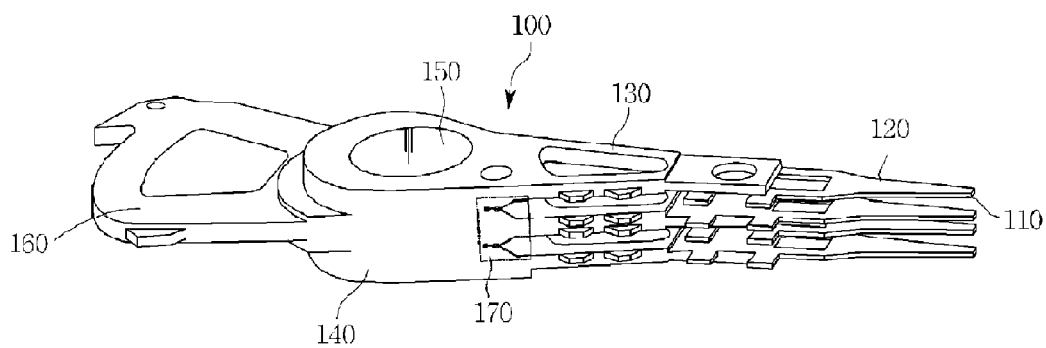
[Fig. 3]
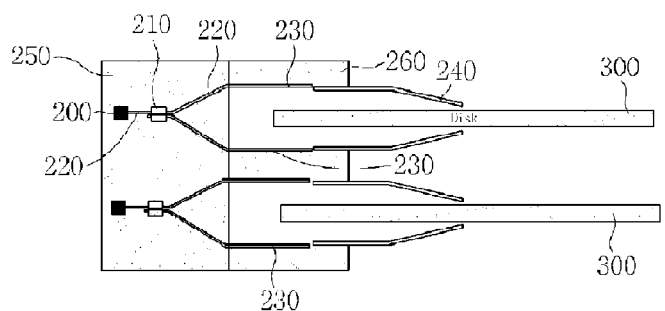

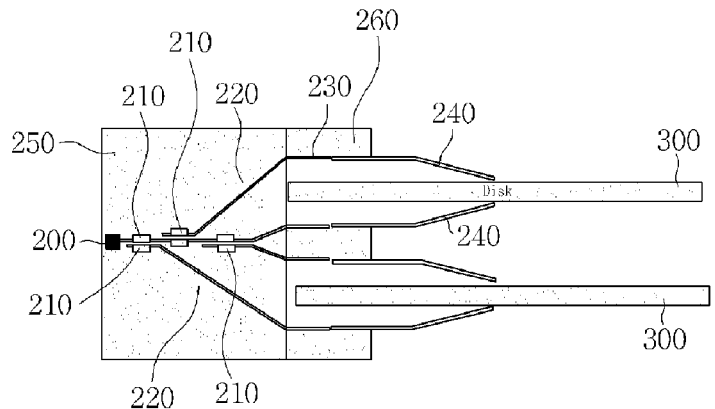
[Fig. 4]
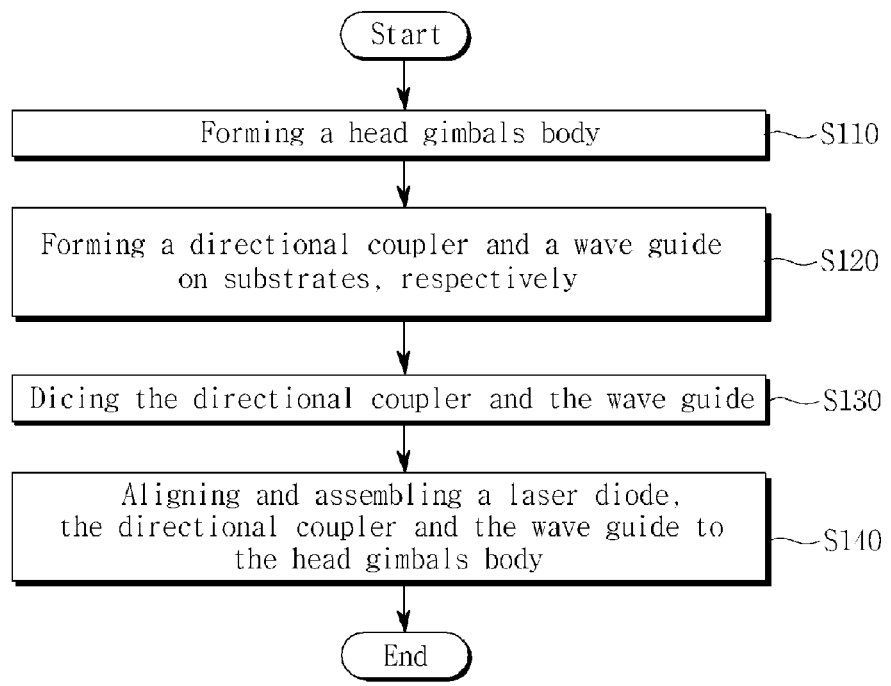
[Fig. 5]
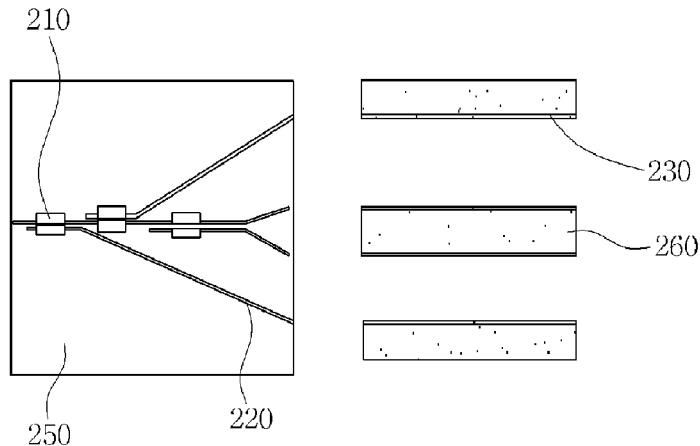
[Fig. 6]

[Fig. 7]
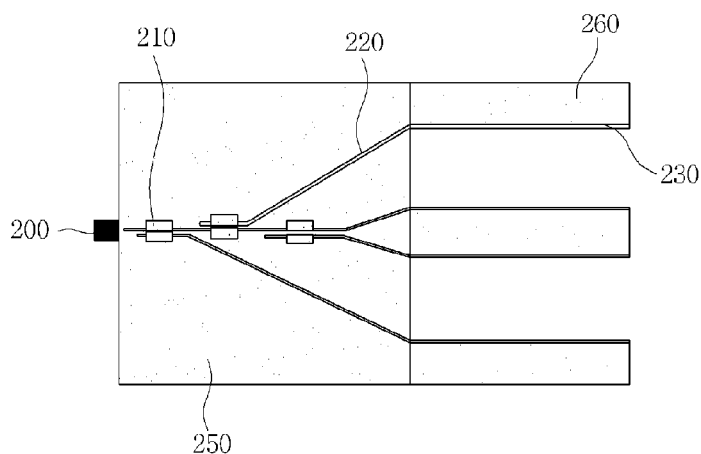
[Fig. 8]
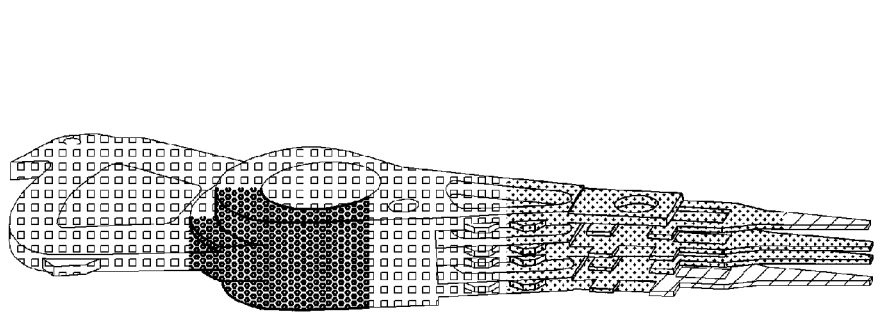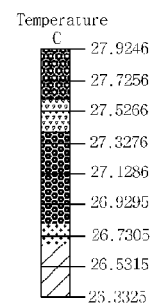
[Fig. 9]
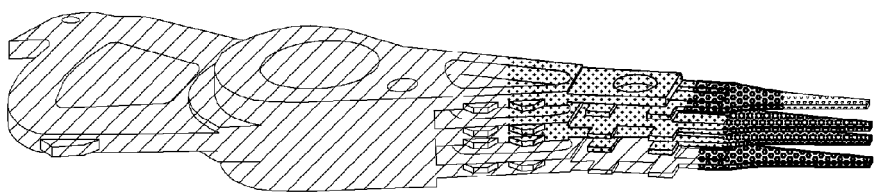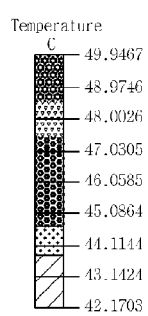

HEAD GIMBALS ASSEMBLY OF HARD DISK AND METHOD OF ASSEMBLING THEREOF

CROSS-REFERENCE TO RELATED PATENT APPLICATIONS

This application is a National Stage of International Application No. PCT/KR2007/000539 filed Feb. 1, 2007 and claims priority from Korean Patent Application No. 10-2006-0053503, filed on Jun. 14, 2006 in the Korean Intellectual Property Office, the disclosure of which is incorporated herein in its entirety by reference.

TECHNICAL FIELD

The present invention relates to a head gimbals assembly for a hard disk and a method of assembling the same, and more particularly to a head gimbals assembly for a hard disk which employs a laser diode so as to record a large amount of information in a thermally assisted magnetic disk recording medium with a high density, and a method of assembling such a head gimbals assembly.

BACKGROUND ART

In general, a computer has an auxiliary memory device as an auxiliary means for a main memory device and records a large amount of data in the auxiliary memory device. For such an auxiliary memory device, a magnetic disk, a magnetic tape, a floppy disk, an optical disk or the like may be employed. A personal computer usually employs a hard disk drive, which incorporates at least one magnetic disk, as an auxiliary memory device.

FIG. 1 is a perspective view schematically showing a conventional hard disk drive.

Referring to FIG. 1, the conventional hard disk drive includes a housing 10, a magnetic disk 20 which is a recording medium provided within the housing 10 (herein below, the magnetic disk is referred to as "disk"), a spindle motor 30 mounted on a base plate 11 of the housing 10 so as to rotate the disk 20, and a head gimbals assembly 40 having a magnetic head 41 for recording/reproducing data.

The housing 10 is provided within the main body of the computer, wherein the housing 10 consists of a base plate 11 for supporting the spindle motor 30 and the head gimbals assembly 40, and a cover plate 12 mounted on the top of the base plate 11 so as to cover and protect a disk or the like.

The disk 20 is a recording medium for recording data, wherein one disk or two or more disks, which are spaced from each other, are installed in such a manner as to be rotated by the spindle motor 30.

The head gimbals assembly 40 includes a head gimbals body mounted to be rotatable about a rotary axis 35 provided on the base plate 11, and a suspension 43, on which a magnetic head 41 is mounted for recording information in/reproducing from the disk 20, wherein the suspension 43 extends from one end of the head gimbals body and a coil rotator 47 for rotating the head gimbals body extends from the other end of the head gimbals assembly.

In the conventional hard disk drive, due to an aerodynamic action between the magnetic head rotating about the pivot hole 45 and the disk 20 rotated by the spindle motor 30, the magnetic disk 41 flies and moves on the surface of the disk 20 while the disk 20 is rotating.

A conventional hard disk drive may be provided with one disk or a plurality of disks. In particular, although such a conventional hard disk drive has been provided with a plurality of disks so as to increase data storage capacity, there has been recently proposed a method of greatly increasing the recording density of a disk so as to allow a sufficiently large amount of data to be stored even if a small number of disks are employed.

For example, U.S. Pat. Nos. 5,199,090 and 6,404,706 disklose a method for recording data in a disk with a high density by supplying heat to a magnetic head for recording/reproducing data by using a laser diode.

DISCLOSURE OF INVENTION

Technical Problem

Although the prior art has proposed a method of recording data into a disk with a high density by using light energy produced from a laser diode as described above, there are some problems in that optical components such as a laser diode, a lens, etc. are additionally needed, the laser diode suffers from deterioration or damage by heat produced from the laser diode fixed to a suspension.

Furthermore, there are also problems in that due to the optical components additionally mounted on the suspension, the magnetic head cannot smoothly fly and the data recording/reproducing rate may be reduced.

Therefore, the present invention has been made in view of the above-mentioned problems, and it is an object of the present invention to provide a head gimbals assembly for a hard disk, which can prevent the performance of a laser diode from being deteriorated and make the flight of a magnetic head be smoothly performed, so that high-density data can be recorded/reproduced, wherein the laser diode is employed so as to increase a data recording density of a magnetic disk.

Another object of the present invention is to provide a method of easily assembling a head gimbals assembly for a hard disk.

Technical Solution

In order to achieve the above-mentioned object, there is provided a head gimbals assembly for a hard disk for use in recording information in one or more disks comprising: a plurality of suspensions, each of which is provided with a magnetic head positioned adjacent to a surface of a corresponding disk so as to record/reproduce information; a head gimbals body having a centrally formed pivot hole which allows the head gimbals body to be fitted in such a manner as to be rotatable in relation to the disk, the suspensions extending from one end of the head gimbals body; a coil rotator provided at the other end of the head gimbals body so as to rotate the head gimbals body about the pivot hole; and a laser assembly having at least one laser diode and at least one wave guide, the light emitted from any of the laser diodes being guided to a corresponding magnetic head by the wave guide.

According to an embodiment of the present invention, the head gimbals body is formed of aluminum or an aluminum alloy. In addition, the light emitted from anyone of the laser diodes may be transferred to two or more disk surfaces by the wave guides.

The laser assembly may comprise at least one directional coupler for adjusting the direction of the light emitted from a corresponding laser diode, wherein the directional coupler is formed on a substrate formed of a lithium niobate (LiNbO3), which is an optoelectronic material.

The wave guide may be formed by aligning a first wave guide and a second wave guide, wherein the first wave guide is formed of titanium on a lithium niobate substrate.

The second wave guide may be formed on a silicon or polymer substrate. The head gimbals assembly may further comprise a monitor photodiode for inspecting the power of the laser diodes, wherein the photodiode is formed together with the wave guide.

According to another aspect of the present invention, there is provided a method of assembling a head gimbals assembly for a hard disk comprising: forming a head gimbals body of a metallic material; forming a directional coupler and a wave guide on different substrates, respectively; dicing the substrates, which are formed with the directional coupler and the wave guide, in such a manner as to correspond the shape of the head gimbals body; and aligning and assembling the directional coupler and the wave guide to the head gimbals body together with a laser diode.

According to a preferred embodiment of the present invention, the directional coupler is formed on a substrate formed of lithium niobate (LiNbO3) which is an optoelectronic material.

Advantageous Effects

Because the inventive head gimbals assembly for a hard disk has a laser diode used for increasing a data recording density of a magnetic disk, which is not fixed to a suspension but fixed to a head gimbals body which serves as a support for the head gimbals assembly, the heat produced from the head gimbals assembly can be efficiently lowered. Furthermore, because the number of peripheral optical components of the suspension is reduced, the flight of a magnetic head can be smoothly performed, so that the recording/reproducing of high density data can be efficiently performed.

In addition, because the inventive head gimbals assembly for a hard disk has diverged optical paths extending from a laser diode to a magnetic head, it is possible to reduce the number of necessary laser diodes, as a result of which the cost of production can be lowered.

Moreover, according to the inventive method of assembling a head gimbals assembly for a hard disk, an optical path of guiding light produced from a laser diode to a magnetic head can be easily achieved.

BRIEF DESCRIPTION OF THE DRAWINGS

The foregoing and other objects, features and advantages of the present invention will become more apparent from the following detailed description when taken in conjunction with the accompanying drawings in which:

FIG. 1 is a perspective view schematically showing a conventional hard disk drive;

FIG. 2 is a perspective view of a head gimbals assembly for a hard disk according to an embodiment of the present invention;

FIGS. 3 and 4 schematically show embodiments in which wave guides are formed from a laser assembly attached to the head gimbals body of FIG. 2 to disks;

FIG. 5 is a flowchart showing a method of assembling a head gimbals assembly according to an embodiment of the present invention;

FIGS. 6 and 7 are views showing a wave guide area in the process of performing the method of FIG. 5;

FIG. 8 shows the results of a simulated test for confirming the change of temperature in a head gimbals assembly having a laser diode fixed to the head gimbals body like the inventive head gimbals assembly for a hard disk; and FIG. 9 shows the change of temperature in a conventional head gimbals assembly having a laser diode fixed to a suspension.

(actuator) 100 for a hard disk, which is used for recording information in one or more magnetic disks in the hard disk, includes a plurality of 120, a 140, a 160, and a 170. Here, light emitted from a laser diode 200 fixed to the head gimbals body 140 is transmitted to a magnetic head 110, which is mounted on a corresponding one of the suspensions 120, respectively, through 220 and 230.

MAJOR REFERENCE SIGNS OF THE DRAWINGS 40,100: head gimbals assembly
110: magnetic head
120: suspension
130: head stack assembly
140: head gimbals body
150: pivot hole
160: coil rotator
170: laser assembly
200: laser diode
210: directional coupler
220,230: wave guide
240: other wave guide
250, 260: substrate

MODE FOR THE INVENTION

Hereinafter, preferred embodiments of the present invention will be described with reference to the accompanying drawings.

FIG. 2 is a perspective view of a head gimbals assembly for a hard disk according to an embodiment of the present invention, and FIGS. 3 and 4 schematically show embodiments in which wave guides extend from a laser assembly attached to the head gimbals body of FIG. 2 to disks, respectively.

As shown in FIGS. 2 to 4, the inventive head gimbals assembly (actuator) 100 for a hard disk, which is used for recording information in one or more magnetic disks in the hard disk, includes a plurality of suspensions 120, a head gimbals body 140, a coil rotator 160, and a laser assembly 170. Here, light emitted from a laser diode 200 fixed to the head gimbals body 140 is transmitted to a magnetic head 110, which is mounted on a corresponding one of the suspensions 120, respectively, through wave guides 220 and 230.

The suspensions 120 elastically support the magnetic heads 110, which are mounted on the tip ends of the suspensions 120, respectively, wherein each of the magnetic heads 110 is supported by a corresponding suspension in such a manner as to be positioned adjacent to a surface of a corresponding disk rotated at a high speed and to fly and move above the disk surface so as to record/reproduce information of the disk. The number of the suspensions 120 is determined depending on the number of disks received in the hard disk drive. For example, for a single disk, two suspensions are used.

A pivot hole 150 is formed at the center of the head gimbals body 140, wherein the head gimbals body 140 rotates about the pivot hole 150, which is fitted on a rotary axis (see FIG. 1) fixed to a base plate (see FIG. 1) of the hard disk drive. A head stack assembly 130 extending from the center of the head gimbals body 140 to the suspensions 120 takes a form determined according to the number of disks received in the head stack assembly 130. For example, if two disks are received, the head stack assembly 130 takes a form of the letter "E" (it may be referred to as "E block").

The head gimbals body 140 serves as a support for the head gimbals assembly, the suspensions 120 extending from one end of the head gimbals body 140, and transmits rotating movement to the magnetic heads about the rotary axis.

The coil rotator 160, which is provided at the other end of the head gimbals body 140, serves as a driving motor for rotating the head gimbals body 140 with a force produced as electric currents are applied to an electrically conductive member carrying a magnetic field.

The laser assembly 170 includes one or more laser diodes 200 fixed to the head gimbals body 140, and wave guides 220 and 230 for fixing the laser diodes 200 and guiding light produced from the laser diodes 200.

Referring to FIGS. 3 and 4, the light produced from the laser diodes 200 is transmitted by the wave guides 220 and 230 and other wave guide 240 formed on the suspensions. At this time, the paths for transmitting the light of the laser diodes from the suspensions to the surfaces of the disks are the same with those of a conventional head gimbals assembly for a hard disk having laser diodes fixed on suspensions, wherein the paths are arranged in relation to the wave guides 220 and 230 formed in the head gimbals body so that the light of the laser diodes are illuminated to the surfaces of the disks 300.

In order to efficiently reduce the heat produced from the laser diodes 200 while the laser diodes 200 are operating, the gimbals body 140, to which the laser diodes 200 are fixed, is preferably formed of aluminum or an aluminum alloy which is superior to SUS in heat transfer capability.

Furthermore, in order to reduce the number of the laser diodes 220, it is desirable to make the wave guides 220 and 230 be divergent, so that the light emitted from a single laser diode can be transmitted to two or more disk surfaces. At this time, in order to make the direction of light emitted from the laser diode be divergent, it is desirable to provide one or more directional couplers 210 in the laser assembly 170, wherein each of the directional couplers 210 is preferably formed on a substrate formed of lithium niobate (LiNbO3) which is a optoelectronic material.

The light emitted from a laser diode 200 suffers from change in refractive index by voltage applied to the electrodes of the directional couplers and is transferred along the path of wave guides 220 and 230 selected by a mode coupling phenomenon. As a result, it is possible to selectively transfer light toward a desired suspension using a single laser diode. At this time, a first wave guide 220 formed on the lithium niobate substrate is preferably formed by diffusing titanium into the lithium niobate substrate 250.

The light transferred to the first wave guide 220 selected in this manner is preferably transferred to another wave guide 240 of the suspension by a second wave guide 230 formed on a silicon or polymer substrate 260. In order to change the path of light produced from a laser diode 200 to the other wave guide 240, it is desirable to divisionally change the path of the light through the first wave guide 220 and the second wave guide 240 and to form the wave guides 220 and 230 in such a manner as to correspond with the configuration and type of the head gimbals body. This is because it is easier to gradually change the path of the light produced from the laser diode 200 than to change the light path at once.

It is more desirable that a monitor photodiode (not shown) for inspecting the power of the laser diode is formed on the same substrate with a directional coupler or a wave guide.

The method of changing an optical path by adjusting voltage through a directional coupler formed together with wave guides or transferring light by aligning the wave guides uses an optical signal transmission technology, which is employed in the optical communication field, which is advantageous in that light emitted from a single laser diode can be easily transferred to the surfaces of plural disks through suspensions.

In the inventive head gimbals assembly for a hard disk, a laser diode is fixed to a head gimbals body having a large metallic part unlike the prior art. Therefore, the heat produced from the laser diode can be rapidly removed, thereby preventing the characteristic of the laser diode from being deteriorated.

In addition, because the number of optical components attached to the suspensions for supporting magnetic heads can be reduced, the flight of the magnetic heads can smoothly performed.

Now, a method of assembling the gimbals assembly for a hard disk according to the present invention will be described.

FIG. 5 is a flowchart showing a method of assembling a head gimbals assembly according to an embodiment of the present invention, and FIGS. 6 and 7 are views showing the wave guide area in the process of performing the method of FIG. 5. The components, which are the same as those shown in FIGS. 3 and 4 in configuration and function, are denoted by the same reference numerals used in FIGS. 3 and 4.

As shown in FIGS. 5, 6 and 7, according to the inventive method of assembling the head gimbals assembly for a hard disk, a head gimbals body is firstly formed of a metallic material (S110). The head gimbals body may be formed through a method which is the same with that for fabricating a conventional head gimbals assembly for a hard disk. At this time, the head gimbals body is preferably formed of aluminum or an aluminum alloy so as to increase the thermal conductivity thereof.

If the head gimbals body is prepared in this manner, a directional coupler 210 and wave guides 220 and 230 to be assembled to the head gimbals body are formed on different substrates 250 and 260, respectively (S120). At this time, it is desirable to form the directional coupler 210 and the wave guides 220 and 230 on the different substrates 250 and 260, respectively, for example, through a semiconductor process, so as to save the cost of production as well as to mass-produce directional couplers and wave guides which have a consistent performance.

The monitor photodiode (not shown) for inspecting the power of a laser diode is preferably formed on the same substrate with the directional coupler 210 or the wave guides 220, 230. The directional coupler 210 is preferably formed on a substrate formed of lithium niobate (LiNbO3), which is an optoelectronic material.

The directional coupler 210 and the wave guides 220 and 230 formed on the different substrates as described above are separated from each other with the desired sizes by dicing them from the different substrates in such a manner as to correspond to the form of the head gimbals body (S130).

Next, the laser diodes and the dies formed with the directional coupler 210 and the wave guides 220 and 230 are aligned with each other and assembled to the head gimbals body (S140). At this time, it is desirable to assemble the laser diode 200, the directional coupler 210 and the wave guides 220 and 230 while confirming the alignment thereof by operating the laser diode or indicating a mark on each of dies.

In order to confirm the temperature characteristic of the inventive head gimbals assembly for a hard disk, a simulated test was performed and the following results were obtained.

FIG. 8 shows the results of the simulated test for confirming the change of temperature of a head gimbals assembly having a laser diode fixed to the head gimbals body like the inventive head gimbals assembly for a hard disk, and FIG. 9 shows the change of temperature of a head gimbals assembly having a laser diode fixed to a suspension like a conventional head gimbals assembly.

The simulated test was performed using Icepak V4.2, which is commercially available software. According to the data of test results, when the laser diode was fixed to a suspension, the temperature of the laser diode was increased to 50-75° C., and the temperature of the tip end of the suspension increased to 28-32° C. Whereas, when the laser diode was fixed to the head gimbals assembly like the inventive head gimbals assembly, the temperature either at the laser diode or at the tip end of the suspension was not more that 12° C., which is not substantially changed.

Therefore, if the inventive head gimbals assembly for a hard disk, there are advantages in that the heat produced from a laser diode is efficiently transferred and removed through the head gimbals body formed of an aluminum-based material and hence the characteristics of the laser diode is not deteriorated.

INDUSTRIAL APPLICABILITY

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A head gimbals assembly for a hard disk for use in recording information in one or more disks comprising:
   a plurality of suspensions, each of which is provided with a magnetic head positioned adjacent to a surface of a corresponding disk so as to record/reproduce information;
   a head gimbals body having a centrally formed pivot hole which allows the head gimbals body to be fitted in such a manner as to be rotatable in relation to the disk, the suspensions extending from one end of the head gimbals body; a coil rotator provided at the other end of the head gimbals body so as to rotate the head gimbals body about the pivot hole; and
   a laser assembly having at least one laser diode and at least one wave guide, the light emitted from any of the laser diodes being guided to a corresponding magnetic head by the wave guide,
   wherein the light emitted from anyone of the laser diodes is transferred to two or more disk surfaces by the wave guides,
   wherein the laser assembly comprises at least one directional coupler for adjusting the direction of the light emitted from a corresponding laser diode, and
   wherein the directional coupler is formed on a substrate formed of a lithium niobate (LiNb03), which is an optoelectronic material.

2. The head gimbals assembly of claim 1, wherein the head gimbals body is formed of aluminum or an aluminum alloy.

3. The head gimbals assembly of claim 1, wherein each of the wave guides is formed by aligning a first wave guide and a second wave guide.

4. A head gimbals assembly for a hard disk for use in recording information in one or more disks comprising:
   a plurality of suspensions, each of which is provided with a magnetic head positioned adjacent to a surface of a corresponding disk so as to record/reproduce information;
   a head gimbals body having a centrally formed pivot hole which allows the head gimbals body to be fitted in such a manner as to be rotatable in relation to the disk, the suspensions extending from one end of the head gimbals body; a coil rotator provided at the other end of the head gimbals body so as to rotate the head gimbals body about the pivot hole; and
   a laser assembly having at least one laser diode and at least one wave guide, the light emitted from any of the laser diodes being guided to a corresponding magnetic head by the wave guide,
   wherein each of the wave guides is formed by aligning a first wave guide and a second wave guide
   wherein the first wave guide is formed of titanium on a lithium niobate substrate.

5. The head gimbals assembly of claim 4, wherein the second wave guide is formed on a silicon or polymer substrate.

6. A head gimbals assembly for a hard disk for use in recording information in one or more disks comprising:
   a plurality of suspensions, each of which is provided with a magnetic head positioned adjacent to a surface of a corresponding disk so as to record/reproduce information;
   a head gimbals body having a centrally formed pivot hole which allows the head gimbals body to be fitted in such a manner as to be rotatable in relation to the disk, the suspensions extending from one end of the head gimbals body; a coil rotator provided at the other end of the head gimbals body so as to rotate the head gimbals body about the pivot hole;
   a laser assembly having at least one laser diode and at least one wave guide, the light emitted from any of the laser diodes being guided to a corresponding magnetic head by the wave guide,
   a monitor photodiode for inspecting the power of the laser diodes, wherein the photodiode is formed together with the wave guide.

7. A method of assembling a head gimbals assembly for a hard disk comprising: forming a head gimbals body of a metallic material;
   forming a directional coupler and a wave guide on different substrates, respectively;
   dicing the substrates, which are formed with the directional coupler and the wave guide, respectively, in such a manner as to correspond the shape of the head gimbals body; and
   aligning and assembling the directional coupler and the wave guide to the head gimbals body together with a laser diode,
   wherein the directional coupler is formed on a substrate formed of lithium niobate (LiNb03) which is an optoelectronic material.

* * * * *